United States Patent
Seigenji

[11] 3,927,938
[45] Dec. 23, 1975

[54] COLOR BALANCE ADJUSTING DEVICE FOR COLOR PRINTING

[75] Inventor: Kiyoshi Seigenji, Osaka, Japan

[73] Assignee: Minolta Camera Kabushiki Kaisha, Osaka, Japan

[22] Filed: Sept. 16, 1974

[21] Appl. No.: 506,068

[30] Foreign Application Priority Data
Sept. 24, 1973 Japan.............................. 48-107113

[52] U.S. Cl. .................. 355/38; 250/226; 356/188; 356/223
[51] Int. Cl.². ... G03B 27/78; G01J 3/48; G01J 1/42
[58] Field of Search ......... 355/38, 68, 69; 250/226; 356/175, 188, 202, 226, 223

[56] References Cited
UNITED STATES PATENTS

| | | | |
|---|---|---|---|
| 2,947,810 | 8/1960 | Horsley............................. | 355/38 X |
| 3,640,620 | 2/1972 | Shatz et al. ........................... | 355/38 |
| 3,724,954 | 4/1973 | Dreyfoos, Jr. .................... | 355/38 X |
| 3,728,022 | 4/1973 | Rodriguez.......................... | 355/38 X |

Primary Examiner—Richard A. Wintercorn
Attorney, Agent, or Firm—Wolder & Gross

[57] ABSTRACT

A color balance adjusting device for color printing or enlarging is exposed to the light traversing the printer variable density color filters and the color negative and includes a photocell and red, green and blue filters selectively movable into registry with the photocell or three photocells whose incident light traverses respective red, green and blue filters. The output signals from the photocell or photocells are amplified through respective amplifier circuits whose output is connected to an electrical meter, at least two of the amplifier circuits having members for adjusting their gains. Another light measuring device employing the same meter is employed for measuring the total light traversing the color negative. A standard negative is inserted in the printer and the amplifier gains are adjusted for two of the spectral ranges until the meter in each case provides a predetermined reading, and the standard negative is replaced by a negative to be printed without disturbing the amplifier gains and the neutral density filters associated with the compensating filters are adjusted to achieve the predetermined meter readings.

22 Claims, 7 Drawing Figures

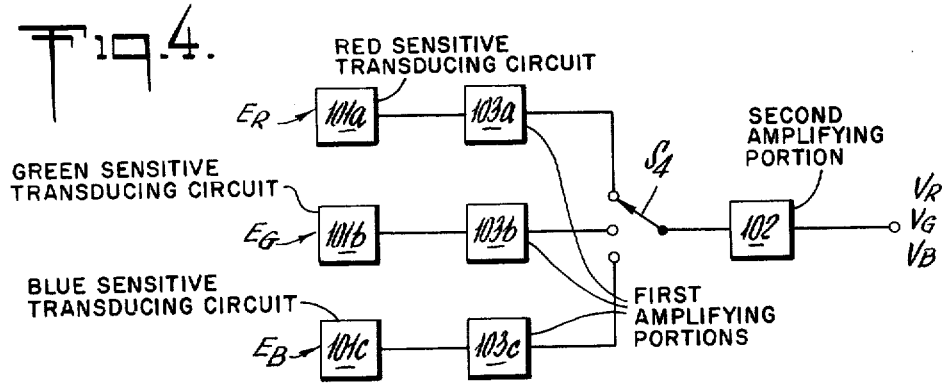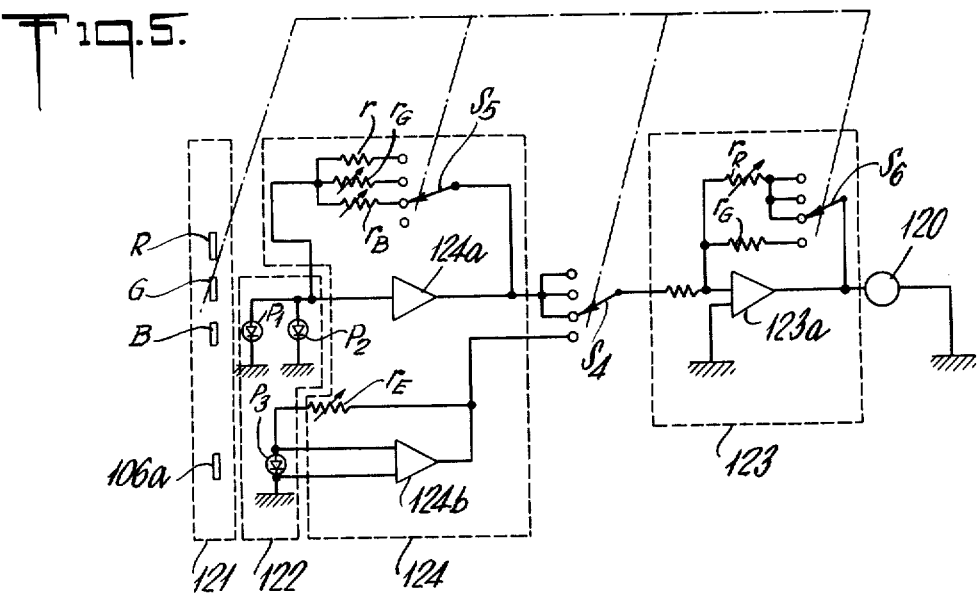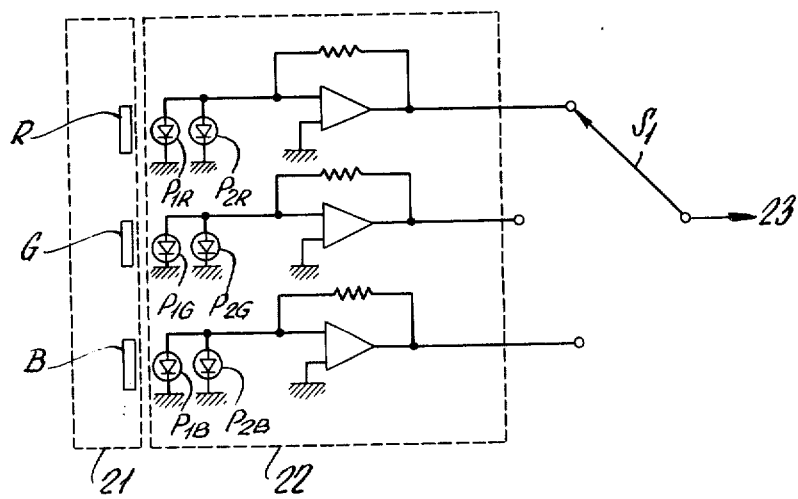

COLOR BALANCE ADJUSTING DEVICE FOR COLOR PRINTING

BACKGROUND OF THE INVENTION

The present invention relates generally to an improved color balance adjusting device for color printing, and it relates more particularly to an improved device for indicating the color densities of three color filters of yellow (Y), magenta (M) and cyan (C), which filters are disposed in the optical exposure path of an enlarger, for the purpose of preparing a positive print having good color balance, when printing the image of a photographic object in a color negative on a photographic paper or substrate.

In general, the following procedure is followed when the image of an object in a color negative is printed on a photographic paper. Color compensating filters of yellow (Y), magenta (M) and cyan (C) (these filters will hereinafter be referred to as Y.M.C. color compensating filters) and the standard negative film (it is desirable that as many colors as possible be used so as to give a gray color, if the light passed therethrough are mixed) are inserted in the exposure light path of an enlarger; a plurality of positive prints are prepared, with color densities of those color compensating filters being varied; then a positive print having an optimum color balance and density is selected among those positive prints; the ratio of spectral energies of red (R), green (G) and blue (B) of the light which has been used for exposure of the photographic paper upon preparation of the positive print having an optimum color balance and density, and the exposure amount which is the product of the total sum of spectral energies and exposure time are determined; a given color negative to be printed is inserted in the exposure light path in place of the standard negative film; and then the color densities of the Y.M.C. color compensating filters and the exposure amount are adjusted in a manner that the ratio of the spectral energies of the light which has been used for exposure of a photographic paper after being transmitted through the color compensating filters as well as through a given color negative will be equal to those values obtained in the aforesaid manner. It will be appreciated that a positive print having optimum color balance and densities for a given color negative may be obtained.

Assume that the values of the spectral energies of R.G.B. of the light which has been used for exposure of a photographic paper upon preparation of the positive print having an optimum color balance and density owing to the standard negative print are ERO, EGO, EBO, respectively, the exposure time be $T_o$, the values of spectral energies of R.G.B. of the light which has been used for exposure of a photographic paper, when a given negative is used, are ER1, EG1, EB1, respectively, the total sum of the spectral energies is EE1, and the exposure time is T1; then, $$\text{EBO/ERO} = \text{EB1/ER1} = k1 \quad (1)$$
$$\text{EGO/ERO} = \text{EG1/ER1} = k2 \quad (2)$$
$$T_o.\text{EBO} = T1.\text{EE1} = k3 \quad (3)$$

wherein $k1, k2, k3$ are constants. Thus, the color densities of Y.M.C. color compensating filters and the exposure amount may be adjusted so as to satisfy the above equations.

when a positive print having good color balance is desired to be prepared, the calculation as shown in the equations (1) and (2) will be required. The prior art color balance adjusting device is provided with a logarithmic converting circuit and a differential amplifying circuit to this end, whereby the respective spectral energies of the light which is used for exposure of a photographic paper are simultaneously photoelectrically converted by means of separate light measuring elements having a spectral sensitivity substantially the same as that of the photograhic paper, and then the photoelectric currents thus obtained are introduced to separate logarithmic converting circuits, after which the outputs of those logarithmic converting circuits are differentially amplified to indicate the same on a meter.

However, logarithmic converting circuits, in general, seriously suffer from the disadvantage of varying outputs due to ambient temperature change. In other words, with the conventional color balance adjusting device using logarithmic converting circuits, varying indications on a meter will result, if there is an ambient temperature change in the logarithmic converting circuits, even though the ratio of the spectral energies of R.G.B. of the light which has been used for the exposure of a photographic paper, when a given color negative is inserted is in an exposure light path is equal to the ratio when the standard negative is inserted. For this reason, the conventional color balance adjusting device requires some temperature compensating circuit for compensating any variation in output due to temperature change which affects the logarithmic converting circuits, thus resulting in a complicated construction of the circuits and a loss of reliability, and a costly device.

Furthermore, with the conventional color balance adjusting device, an output signal from a photoelectrical converting portion corresponding to the respective spectral energies of R.G.B. will appear as an output in the logarithmic converting circuit, after being logarithmically converted, while noise produced in the differential amplifying circuit and the like following the logarithmic converting circuit is linearly amplified, with the result that the S/N ratio of the input to be introduced to a meter will be unfavorably reduced to thereby cause a variation in the indications by the meter, except when the output signal from the photoelectric converting portion, which corresponds to the respective spectral energies of R.G.B., is extremely small.

On the other hand, the conventional color balance adjusting device is, as well, provided with an detecting circuit for detecting the exposure amount. However, this exposure amount detecting circuit, in general, photoelectrically converts the total energies of the light, which is used for exposure of a photographic paper, with the aid of light measuring elements for detecting the exposure amount, and the photoelectric current thus obtained is then logarithmically compressed to thereby amplify same. The reason for a need to use a logarithmic compressing circuit is that, in the conventional color balance adjusting device, the detecting portion for spectral energy ratio is provided with a logarithmic compressing circuit, whereby the ratio of the spectral energies is indicated as a logarithmic value on a meter, so that it is designed so that the indication of the exposure amount on a meter and the indication of the spectral energy ratio may be read at the same time, by means of commonly used graduations on the meter.

As has been described earlier, the logarithmic compressing circuit is susceptible to temperature change, so that the conventional device poses disadvantage of incurring a variation in the indications of exposure amount, which variation is caused as a result of temperature change. In addition, like the aforesaid spectral energy ratio, there occurs a variation in the indication of exposure amount due to noise produced in the amplifying circuit.

OBJECTS OF THE INVENTION

It is accordingly a principal object of the present invention to provide a color balance adjusting device for color printing, which is high in reliability and simple in construction and which accurately indicates the respective color densities of the respective color compensating filters of yellow, magenta and cyan, without being affected by ambient temperature change, for the purpose of obtaining a positive print having an optimum color balance from a given color negative.

It is another object of the present invention to provide a color balance adjusting device which is high in reliability and simple in construction, and which accurately indicates the respective color densities of the respective color compensating filters of yellow, magenta and cyan, for obtaining a positive print having an optimum color balance from a given color negative, while minimizing the influence by noise produced in the electric circuits.

IT is a further object of the present invention to provide a color balance adjusting device for color printing, which is high in reliability and simple in construction and which accurately indicates the exposure amount without being affected by temperature changes.

It is yet a further object of the present invention to provide a color balance adjusting device for color printing, which is high in reliability and simple in construction and which accurately indicates the exposure amount, while minimizing the influence of noise produced in the electric circuits.

SUMMARY OF THE INVENTION

According to the present invention, there is provided a color balance adjusting device for color printing, in which the respective spectral energies of red, green and blue of the light from a light source, which light has been transmitted through a negative and the respective color compensating filters of yellow, magenta and cyan, which filters permit the adjustment of the respective densities of colors, are photoelectrically converted, after which electric outputs corresponding to spectral energies of the respective colors are amplified at independent amplification gains for indication, with two of the aforesaid amplification gains being adjustable. This adjustment permits storage of a spectral energy ratio of red, green and blue of the aforesaid light, as an adjusted amplification gain.

Accordingly, after the spectral energy ratio of red, green and blue of the light, which has been transmitted through the respective color compensating filters set to the same color densities as when a positive print having an optimum color balance is obtained for the aforesaid standard negative as well as through the aforesaid standard negative, has been stored as amplification gains, if the color densities of the respective color compensating filters are adjusted in a manner that the indications of respective electrical outputs of red, green and blue of the light which has been transmitted through the aforesaid respective color compensating filters will be equal to each other, the color densities thus adjusted will be those color densities of the aforesaid respective color compensating filters which are to be set for obtaining a positive print having an optimum color balance from a given color negative.

As is clear from the foregoing, the color balance adjusting device according to the present invention dispenses with means for logarithmically converting electric outputs corresponding to spectral energies of red, green and blue as in the conventional device, so that the device of the present invention will not be affected by ambient temperature change, and electric outputs corresponding to the respective red, green and blue are amplified to the same amplification gain, at which the noise is amplified, thereby minimizing unfavorable reduction of S/N ratio due to amplification of noise.

For instance, the color balance adjusting device shown as a fundemental embodiment of the present invention includes: an optical means which includes a light source and color compensating filters of three kinds of colors, i.e., yellow, magenta and cyan permitting the adjustment of color densities, and in which a color negative can be inserted; and a photoelectrically converting means including a light receiving element disposed so as to permit the measurement of the light which has been transmitted through the entire surface of the aforesaid color negative and having three kinds of spectral sensitivities for photoelectrically converting the spectral energies of red, green and blue of the light from a light source, which light has been transmitted through the respective color filters and color negative. Furthermore, the aforesaid device is provided with: switching means switchable in three stages so as to alternatively select the spectral sensitivities of the aforesaid photoelectric converting means; a first amplifying means having three amplification gain setting means to be alternatively selected in association with the aforesaid switching means for selecting spectral sensitivity of the aforesaid photoelectric converting means; and a first indicating means series connected to the output means of the aforesaid first amplifying means. In addition, the aforesaid first amplifying means is series connected to the aforesaid photoelectric converting means, and at least two of the aforesaid three amplification gain setting means are adjustable. According to the aforesaid device, the electric outputs corresponding to the spectral energies of red, green and blue, which have been photoelectrically converted by means of photoelectric converting means, are sequentially indicated on the first indicating means, so that the amplification gain setting means of the first amplifying means may be adjusted in a manner that the indications on the first indicating means for the respective electric outputs will be equal to each other. This adjustment causes the ratio at spectral energies of red, green and blue to be stored as adjusted values of the amplification gain setting means.

The color balance adjusting device in accordance with one embodiment of the present invention is further provided with a second amplifying means series connected to the aforesaid photoelectrically converting means and to the first amplifying means. This amplifying means may be such as will not permit the adjustment of amplification gain. However, if the amplifying means has an amplification gain setting means adjustable as shown in the embodiment, the output level of the first amplifying means may be varied due to the adjustment of amplification gain setting means, so that the indications of the first amplifying means when the standard negative is inserted into the aforesaid optical means as well as when a given color negative is inserted therein, may be brought into coincidence with each other. Accordingly, it would be sufficient that the first indicating means indicate if the output of the first amplifying means is at a desired level.

The color balance adjusting device according to the one embodiment of the present invention is further provided with an exposure amount detecting photoelectric converting means for photoelectrically converting the total energy of the light from the aforesaid light source, which light has been transmitted through the color negative inserted in said optical means; a light quantity control means such as a diaphragm, which controls the quantity of the light which has been emitted from said light source and incident on said exposure amount detecting photoelectrically convertingg means; a third amplifying means series connected to said exposure amount detecting photoelectrically converting means; and a second indicating means for indicating the output of said amplifying means. In this respect, the third amplifying means has an amplification gain setting means which is adjustable, whereby the output level of the third amplifying means, which is to be indicated on the second indicating means, may be adjusted. In addition, the second means has an indicator moveable in response to the output of the third amplifying means, and graduations for indicating the exposure time. With the aforesaid device, the exposure amount, which provides a positive print having an optimum density for a given negative may be stored as a value of said amplification gain setting means by setting the light quantity control means of said device to the same condition as that of the light quantity control means of an enlarger and as when a positive print having an optimum density is obtained from the standard negative by using the enlarger, and thereafter by inserting the standard negative print in the optical means and then adjusting the amplification degree setting means of the third amplifying means so as to cause the indicator to indicate on its indicating dial the exposure time when a positive print having an optimum density is obtained from the standard negative by using the enlarger. Accordingly, if then a given negative is inserted in the light path in place of the standard negative and the light quantity control means is maintained in the same condition as aforesaid, then the indicator will indicate such an exposure time required for obtaining a positive print having an optimum density from a given color negative as when the light quantity control means is set to the aforesaid condition. On the other hand, if the light quantity control means is adjusted so as to cause the indicator to indicate the exposure time when an optimum positive print is obtained from the standard negative by using the enlarger, then the setting condition of the light quantity control means required for obtaining a positive print having an optimum density may be obtained from a given color negative, according to the exposure time indicated.

As is clear, since the device according to the present invention is not provided with the conventional logarithmic compression means even in the detecting portion for exposure amount, it minimizes the variation in indication on the second indicating means, which is a result of the temperature change or noise.

Meanwhile, with the color balance adjusting means according to the present invention, the aforesaid optical means may be used as an exposure optical means for the enlarger, and, in this case, the aforesaid procedure will be followed in a dark room, in which the enlarger is placed. In contrast thereto, if the aforesaid optical means is independently provided irrespective of the exposure optical means of the enlarger, the aforesaid procedure will be practiced in a separate bright room other than that in which the enlarger is placed.

The above and other objects and features of the present invention will become apparent from the following description taken in connection with the accompanying drawings, in which:

FIG. 4 is a block diagram showing the principle of a modified embodiment of the present invention;

FIG. 5 is a schematic diagram showing in detail electric circuits of the embodiment of FIG. 4;

FIG. 7 is a schematic diagram showing an electric circuit in the photoelectrically converting portion of FIG. 6.

DESCRIPTION OF THE PREFERRED EMBODIMENTS

Figure 1:
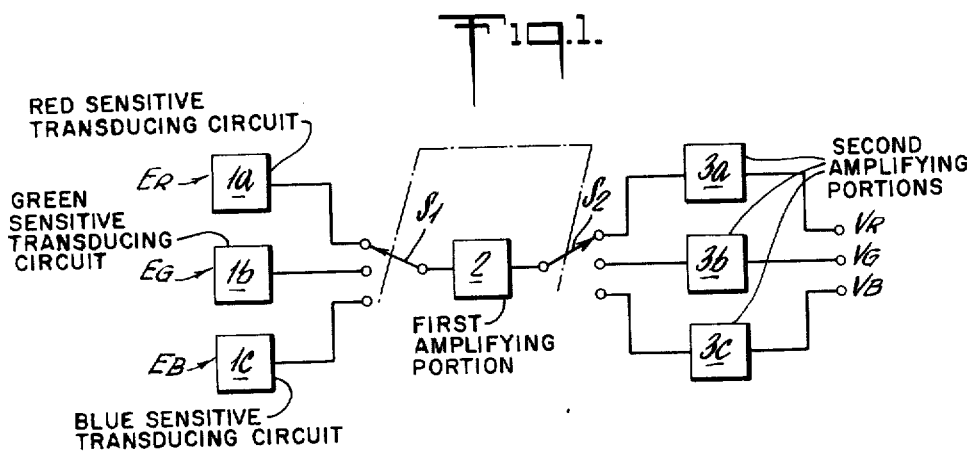
FIG. 1 is a block diagram showing the principle of a basic embodiment of the present invention.

Referring now to FIG. 1, shown at 1a, and 1b and 1c are photoelectric converting or transducing circuits having spectral sensitivity in their respective regions of red, green and blue, at $S_1$, $S_2$ are preferrably gauged selector switches switchable in three stages in cooperation with each other, at 2 a first stage amplifying portion, at 3a, 3b, 3c second stage amplifying portions, 3b and 3c of which permit the adjustment of their amplification gains and 3a of which has a fixed amplification gain.

Assuming that the values of the spectral energies of R.G.B. detected in the photoelectric converting circuits 1a, 1b, 1c are ER, EG, EB and assuming that the amplification gain of the first amplifying portion 2 is αR, the amplification gains of the second amplifying portions 3a, 3b, 3c are CO, αG, αB, then the following outputs VR, VG, VB are obtained at the output terminals of the second amplifying portions 3a, 3b, 3c depending on the switching operations of the selector switches $S_1$ and $S_2$:

$$VR = \alpha R.ER.CO \quad (4)$$
$$VG = \alpha G.EG.\alpha R \quad (5)$$
$$VB = \alpha B.EB.\alpha R \quad (6)$$

If it is assumed that αR is maintained constant despite the switching operation of the selector switches $S_1$, $S_2$ and that VR, VG, VB are equal to each other, then;

$$EG/ER = CO/\alpha G \quad (7)$$
$$EB/ER = CO/\alpha B \quad (8)$$

Nevertheless, since the amplification gain CO of the second amplifying portion 3a is constant, the amplification gains αG; αB of the remaining second amplifying portions 3b, 3c will depend on the ratio of spectral energies ER/EG, ER/EB. Accordingly, if the amplification gains αG. αB are adjusted so as to obtain VR = VG = VB by maintaining αR constant for the light having a specific spectral energy ratio, the spectral energy ratio thereof will be stored as amplification gains of αG.αB, while thereafter the spectral energy of the light is adjusted so as to give VR = VG = VB for a given light, as well, and the spectral energy ratio thereof will be maintained at the aforesaid specific value.

From the formulas (4), (5) and (6), the following relations are also obtained:

$$\frac{E_G}{E_R} = \frac{V_G}{V_R} \frac{C_0}{\alpha_G} \qquad (7)'$$

$$\frac{E_B}{E_R} = \frac{V_G}{V_R} \frac{C_0}{\alpha_B} \qquad (8)'$$

Whereas the formulas (7) and (8) are obtained on the supposition wherein $V_R = V_G = V_B$, these formulas (7)' and (8)' represent a general principle of the present invention for $E_G/E_R$ and $E_B/E_R$ are dependent on $\alpha_G$ and $\alpha_B$ respectively insofar as $V_G/V_R$ and $V_B/V_R$ are constant. That is, $E_G/E_R$ and $E_B/E_R$ of a standard light having a specific spectral energy proportion are memorized as $\alpha_G$ and $\alpha_B$ respectively by adjusting $\alpha_G$ and $\alpha_B$ so as to result in $V_R = \alpha V_G = \beta V_B$ ($\alpha$ and $\beta$ are arbitrary constants), and so thereafter, if the relation of $V_R = \alpha V_G = \beta V_B$ is obtained between the outputs $V_R$, $V_G$ and $V_B$ for a given or required light with $\alpha_G$ and $\alpha_B$ remained constant, it can be concluded that the given or required light has the same spectral energy proportion as aforesaid standard light. Accordingly it should be noted that the embodiment which is based upon aforesaid formulas (7) and (8), discloses only one preferred form of the present invention.

The first embodiment utilizes this principle, in which the three kinds of photoelectric coverting circuits having spectral sensitivity in the respective regions of red, green and blue are sequentially but alternatively connected to the first stage amplifying portion of the second amplifying portion, while the second amplifying portion is arranged so as to select the amplification gain in three stages commensurate to the sequential but alternative connection of the aforesaid three kinds of photoelectric converting circuit to the aforesaid first amplifying portion. More particularly, two out of the three stage amplification gains may be adjusted in a manner that the respective outputs of the aforesaid second amplifying portions to the aforesaid photoelectric converting circuit will be equal to each other to thereby store the spectral energies of the light as the two stage amplification gains, after which the respective color densities of the Y.M.C. color compensating filters will be indicated so as to give spectral energy ratio of Y.M.C. such that the spectral energy ratio will be given to the light transmitted through a given color negative so as to equalize the respective outputs of the aforesaid second stage amplifying portion.

Figure 2:
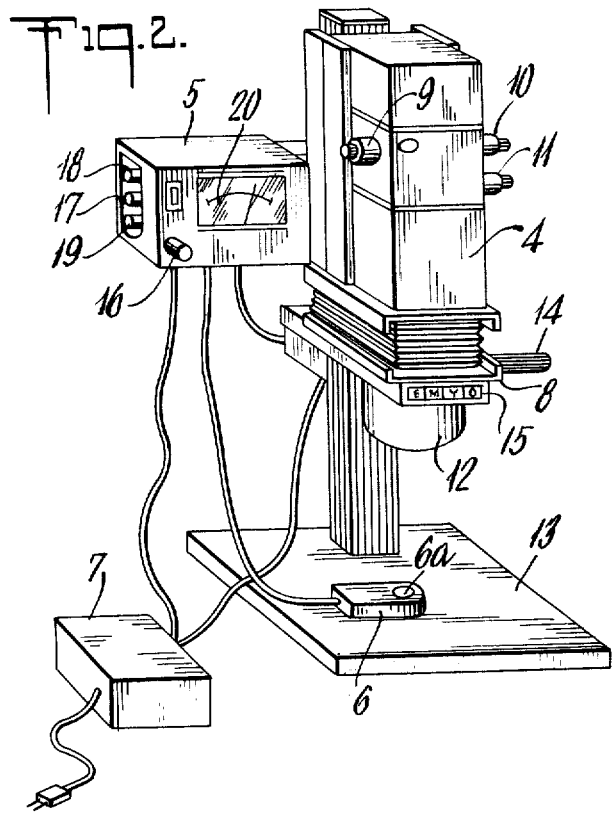
FIG. 2 is a perspective view of the color balance adjusting device in FIG. 1 which is used in combination with an enlarger.

FIG. 2 shows a color balance adjusting device 5 embodying the present invention and used coupled with an enlarger 4. Shown at 6 is an exposure amount detecting portion having a spot light receiving aperture 6a and at 7 an electric power source for supplying an electric power thereto.

The enlarger 4 is provided, although not shown, with an exposure light source such as a halogen lamp, color compensating filters for three colors of Y.M.C., a mixing box for mixing and diffusing the light transmitted through those color compensating filters and stage for replaceably holding a color negative in a well known manner. In addition, provided on an enlarging lens board 8, but in a position to permit viewing the entire surface of the color negative to be inserted into the inserting portion for the aforesaid color negative, but in a position symmetric with respect to the optical axis of the exposure light path of the enlarger 4, are color balance light receiving elements so as to measure the light without deflection, which light has been transmitted through one of the light measuring filters of R.G.B. to be described later, and through one of the ND filters to be also described later. In addition, three light measuring filters of R.G.B. adapted to transmit only the light, covered in the respective wave length regions of R.G.B., out of the lights which have been transmitted through the Y.M.C. color compensating filters as well as through the aforesaid color negative may be inserted into the front portions of the color balance light measuring elements, without interfering with the exposure light path of the enlarger 4, in a manner to be described later.

The levels of respective outputs of the aforesaid color balance light measuring elements, which levels correspond to the values of respective spectral energies of R.G.B. of the light that has been transmitted through the aforesaid Y.M.C. color compensating filters and color negative and that is to be detected by being transmitted through one of those light measuring filters depend on the spectral energy ratio of R.G.B. of the aforesaid light and on the spectral sensitivity characteristic of the aforesaid color balance light measuring elements. However, since the operational amplifying portion to be described later and to which the output is applied, has an input level region, in which the aforesaid operational amplifying portion is operated satisfactorily, ND filters having varying densities are matched with the respective light measuring filters of R.G.B.

Designated by 9, 10 and 11 are filter knobs for adjusting the color densities by varying the extents of the Y.M.C. color compensating filters inserted into the exposure light path, while there is shown at 12 an enlarging lens for focusing an object image on the color negative on an easel plane 13. A selector 14 permits the switching operation in three stages for sequentially but alternatively insertion of the aforesaid R.G.B. light measuring filters into the front portion of the color balance light measuring elements, as well as the switching operation for detecting the exposure amount, as will be described later. A pilot lamp 15 is adapted to be illuminated in association with the switching operation of the selector 14 in a manner that lamps C, M, Y and E will be illuminated, respectively, (i) when the selector is switched so as to allow the R light measuring filter to be inserted, (ii) when switched so as to allow the G light measuring filter to be inserted, (iii) when switched so as to allow the B light measuring filter to be inserted, and (iv) when switched so as to detect the exposure amount. Further, in the present embodiment, the aforesaid R.G.B. light measuring filters may be or may not be inserted in the front portions of the aforesaid color balance light measuring elements when detecting the exposure amount.

Furthermore, the four knobs 16, 17, 18, 19 provided on the body proper of the color balance adjusting device 5 represent R adjusting knob, G memory knob, B memory knob, and a knob for exposure amount E for storing the respective spectral energies of R.G.B. of the light, which has been used for exposure of a photographic paper placed on the easel plane 13, and the exposure amount thereof. Shown at 20 is a voltmeter for indicating the values of respective spectral energies of R.G.B. of the light for the exposure of a photographic paper, which light has been measured at the aforesaid two light measuring elements, as well as for indicating the values of the exposure amounts measured at the exposure amount measuring light receiving element incorporated in the aforesaid exposure amount detecting portion 6.

Figure 3:
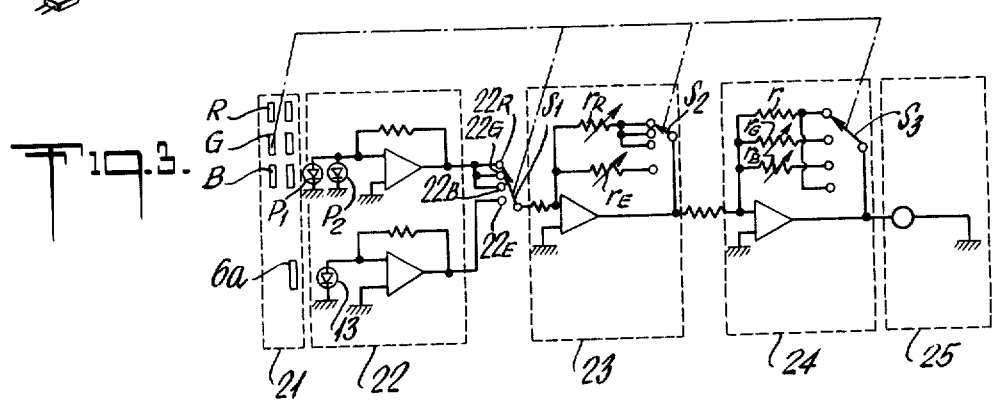
FIG. 3 is a schematic diagram showing in detail an electric circuit of the embodiment given in FIG. 1.

As shown in FIG. 3 which is a diagram illustrating the circuit arrangement of the present embodiment, 21 designates a filter portion which consists of the aforesaid R.G.B. light measuring filters, the aforesaid spot light receiving aperture 6a and the aforesaid ND filter. A photoelectric converting portion is provided with two color-balance light receiving elements $P_1$ and $P_2$, and an exposure amount measuring light receiving element $P_3$ incorporated in the aforesaid exposure amount detecting portion 6. The outputs of these light receiving elements $P_1$, $P_2$ and $P_3$ are amplified by means of inverse feedback amplifying circuits using operational amplifying circuits (for instance, NEC make $\mu$PC152A) and then fed to the respective terminals 22R, 22G, 22B, 22E of the selector switch S1 switchable in association with the selector 14.

A first stage operational amplifier 23 amplifies the output from the photoelectric converting portion 22, a second stage operational amplifying portion further amplifies the output of the first stage operational amplifying portion 23, and both of those amplifying portions consist of feedback amplifying circuits using operational amplifiers (such as NEC make $\mu$PC55A/255A) and are provided in the color balance adjusting device 5. The first operational amplifying portion 23 is provided with two variable resistors $r_R$ and $r_E$ whose resistances are adjustable by means of the R adjusting knob 16 and E memory knob 19 and which are connected in parallel to each other. These variable resistors $r_R$ and $r_E$ may be selected by means of the selector switch S2 operable in association with the selector 14. Thus, for the adjustment of the output corresponding to the respective spectral energies of R.B.G., $r_R$ is used as feedback resistor, and for the adjustment of the output corresponding to the exposure amount. $r_E$ is used as the feedback resistor, respectively. In contrast thereto, the second stage operational amplifying portion 24 is provided with a fixed resistor $r$ and two variable resistors $r_G$, $r_B$ adjustable by means of G memory knob 17 and B memory knob 18. As shown, those fixed resistor $r$ and variable resistors $r_G$ and $r_B$ are connected in parallel and selectable by means of the selector switch $S_3$ operable in association with the aforesaid selector 14. Thus, the fixed resistor $r$ is used as a feedback resistor for the adjustment of the output corresponding to the spectral energy of R and for the adjustment of the output corresponding to the exposure amount, while $r_G$ is used for the adjustment of the output corresponding to the spectral energy of G, and $r_B$ is used for the adjustment of the output corresponding to the spectral energy of B.

These variable resistors $r_R$, $r_E$, $r_G$, $r_B$, fixed resistor $r$ and other resistors used in the present circuit consist of known materials presenting extremely small variation in resistance, when subjected to ambient temperature change.

An output indicating portion 25 indicates the output of the second operational amplifying portion 24, and consists of the suitably connected voltmeter 20. Provided on the indicating dial of the voltmeter 20 are an arbitrary fixed point for adjusting the output corresponding to the values of the respective spectral energies, as will be described later, and graduations for indicating the output corresponding to the exposure amount.

Considering now the operation and application of the improved apparatus as has been described earlier, a positive print having an optimum color balance and density for the standard negative is prepared, and then the respective color densities of the respective color compensating filters for Y.M.C. are set to the values thus obtained, then the selector 14 is manipulated, with the standard negative disposed in the exposure optical path of the enlarger 4, and a light measuring filter for R is inserted in the front portions of the light measuring elements $P_1$, $P_2$. Then, the pilot lamp 15 is illuminated so as to indicate that the value of the spectral energy of R which is interrupted by the color compensating filter for C is being measured, while the selector switch $S_1$ is connected to a terminal 22R in association with the manipulation of the selector 14, and the selector switches S2.S3 are switched, so that $r_R$ and $r$ are selected as feedback resistors for the first and second stage operational amplifiers 23, 24 and the voltage given under the equation (4) is indicated on the voltmeter 20. However, the resistance of the variable resistor $r_R$ may be adjusted by means of R adjusting knob 16 so as to cause the hand of voltmeter 17 to indicate an arbitrarily selected fixed point (such as a point located in the center of an indicating dial).

Subsequently, the selector 14 is switched and the G light measuring filter is inserted in the front portions of the light measuring elements $P_1$, $P_2$. In this case, the pilot lamp 15 for M will be lit, while the selector switch $S_1$ will be connected to a terminal 22G, and then $r_R$ and $r_G$ are selected as feedback resistors for the first and second operational amplifying portions 23, 24, and thus the voltage given under the equation (5) will be indicated on the voltmeter 20. However, the variable resistor $r_G$ is adjusted by means of G memory knob 17 so as to cause the hand to point at the aforesaid fixed point.

Then, the selector 14 is switched, and B light measuring filter is inserted in the front portions of the light receiving elements $P_1$, $P_2$. At this time, the pilot lamp 15 for Y is illuminated, while the selector switch S1 is connected to a terminal 22B, and then $r_R$ and $r_B$ are feedback resistors for the first and second operational amplifying portions 23, 24. Then, a voltage given under the equation (6) is indicated on the voltmeter 20. The variable resistor $r_B$ is adjusted by means of B memory knob 18 so as to cause the hand to point at the aforesaid fixed point, again.

Next, the exposure amount detecting portion 6 is placed on the easel plane 13 in a manner that the spot light receiving aperture 6a will come to a position where that portion of the object image on the standard negative which is most convenient for determining the exposure amount (for instance, a face of a person) is projected. Then, when the selector 14 is switched, the pilot lamp 16 for E is illuminated, indicating that the exposure amount is being measured, the selector switch $S_1$ is connected to a terminal 22E, and the resistors $r_E$ and $r$ are selected as feedback resistors for the first and second stage operational amplifying portions 23, 24.

Thus, a voltage defined as follows is indicated on the voltmeter 20:

$$VE = \alpha E.EE.CO \tag{9}$$

wherein $\alpha E$ represents an amplification gain of the first stage operational amplifying portion 23, when the variable resistor $r_E$ is assumed as being a feedback resistor.

In this respect, if the graduations on the indicating dial are prepared beforehand so as to satisfy the following equation with respect to the exposure time T, then
$$VE = a/T \qquad (10)$$
($a$ represents a constant), then the following relationship is established from the equations (9) and (10).
$$T.EE = a/\alpha E.CO \qquad (11)$$
In this respect, the exposure amount T.EE. depends on the amplification gain $\alpha E$, so that the exposure amount is stored as the resistance of variable resistor $r_E$. Thus, the resistance of the variable resistor $r_E$ is adjusted by means of E memory knob 19 in a manner that the hand of voltmeter 20 points at the indication of the exposure time, when a positive print having an optimum density has been prepared, on the graduations on the indicating dial, which are prepared according to the equation (10).

During the aforesaid operations, the diaphragm (not shown) of the enlarger is set to the same value as when the positive print having an optimum density has been obtained from the standard negative.

In the above manner, the calibration using the standard negative is completed. Then, a given color negative to be printed is inserted in the exposure optical path of the enlarger 4, in place of the standard negative. Then, the selector 14 is first manipulated and the light measuring filter for R is inserted in the front portions of the light measuring elements $P_1$, $P_2$, while the resistance of the variable resistor $r_R$ is adjusted by means of the adjusting knob 16 for R so as to cause the hand of voltmeter 20 to point at the aforesaid fixed point. As can be appreciated from the equations (7) and (8), the values of EG/ER, and EB/ER have nothing to do with the value of $\alpha R$. Thus, the level of the output of the first stage operational amplifying portion 23 corresponding to the value of the spectral energy of R is merely adjusted. According to this operation, if the hand of voltmeter 20 does not point at the aforesaid fixed point, the adjustment will be made by means of the C filter knob 11 so as to vary the color density of the color compensating filter for C.

Upon completion of the aforesaid adjustment, then the selector 14 is switched and the G light measuring filter and B light measuring filter are sequentially inserted in the front portions of the light receiving elements $P_1$, $P_2$, while the color densities of the M color compensating filter and the Y color compensating filter are adjusted by means of the filter knob 10 for M and the filter knob 9 for Y so as to cause the hand of voltmeter 20 to swing to the aforesaid fixed point respectively. In this case, G memory knob 17 and B memory knob 18 should not be disturbed.

Then, the exposure amount detecting portion 6 is placed on the easel plane 13, in a manner that the light receiving aperture $b_a$ is disposed at a position such that that portion of an object image on a given color negative of which it is desired to obtain an optimum density is projected on the light receiving aperture and the selector 14 is switched so as to illuminate the E pilot lamp 15. In this respect, according to this embodiment, there are two methods for indicating the exposure amount. One of these methods is that the diaphragm aperture of the enlarging lens 12 is adjusted so as to cause the hand of voltmeter 20 to point at the indication of the exposure time, when a positive print having an optimum density is prepared from the aforesaid standard negative. The other of those methods is that the exposure time indicated by the hand of voltmeter 20 is read out, with the diaphragm aperture of the enlarging lens 12 set to the same value, as that when a positive print having an optimum density is prepared from aforesaid standard negative. However, according to the latter method, a positive print having an optimum density cannot always be obtained due to the reciprocity law failure of the photographic paper. Thus, the former method is preferred.

Upon completion of the aforesaid operations, if the exposure is effected, with the photographic paper placed on the easel plane 13, then a positive print having an optimum color balance and density for a given color negative is obtained.

As seen in FIGS. 4 and 5 which illustrate a second embodiment of the present invention, 101a, 101b, 101c designate photoelectric transducing or converting portions having spectral responses of sensitivities of red, green and blue, and 103a, and 103b, 103c are first amplifying portions, the portion 103a being series connected to portion 101a, the portion 103b to portion 101b and the portion 103c to the portion 101c, respectively. The portion 103a alone among those amplifying portions having a fixed or constant amplification gain, while the other portions having adjustable amplification gains. On the other hand, shown at 102 is a second amplifying portion which is alternatively connected to one of the first stage amplifying portions by means of a selector switch $S_4$. Assuming that the amplification gains of the first amplifying portions 103a, 103b and 103c are CO', $\alpha G'$, $\alpha B'$, respectively, and that the amplification gain of the second amplifying portion 102 is $\alpha R'$, then the following outputs VR', VG', VB' will appear in the second amplifying portion 102 depending on the switching operation of the selector switch S4.
$$VR' = ER\ CO'\ \alpha R' \qquad (4)'$$
$$VG' = EG\ \alpha G'\ \alpha R' \qquad (5)'$$
$$VB' = EB\ \alpha B'\ \alpha R' \qquad (6)'$$
wherein ER, EG, EB are spectral energies of red, green and blue to be detected by the photoelectric converting portions 101a, and 101b and 101c. More particularly, the equations (4)', (5)', (6)' are equivalent to the equations (4), (5), (6). Thus, it will be appreciated that this embodiment is based on the principle incorporated in the first embodiment.

As illustrated in FIG. 5, 121 is a filter portion consisting of color filters of red (R), green (G) and blue (B) and 106a is a spot light receiving aperture. The color filters of R, G, B are sequentially inserted in front of the light receiving elements $P_1$, $P_2$ for detecting the respective spectral energies of red, green and blue by the switching operation of a selector 114. In this respect, the selector 114 permits another stage of switching operation, but the cooperative operation of the respective color filters of R, G, B with the selector 114 is interrupted Shown at 122 is a photoelectric converting portion which consists of the aforesaid spectral energy detecting light receiving elements $P_1$, $P_2$ and an exposure amount detecting light receiving element $P_3$ provided in the rear of the aforesaid spot light receiving aperture 106a. On the other hand, shown at 124 is a first stage amplifying portion which consists of a feedback amplifying circuit using an opertional amplifier 124a connected to the aforesaid light receiving elements $P_1$, $P_2$, and a feedback amplifying circuit using an operational amplifier 124B connected to the aforesaid light receiving element P3. An operational amplifier 124a is provided with a fixed resistor γ and variable resistors γG, γB which are connected in parallel as shown as feedback resistors. Thus, according to the actuation of the selector switch $S_5$, either one of these resistors is alternatively selected as the feedback resistor of the operational amplifier 124a. In other words, the selector switch S5 is so designed as to be switched in association with the switching operation of the aforesaid selector switch 114. Thus, when the R color filter is inserted in the front of the light receiving elements $P_1$, $P_2$, the fixed resistor γ is selected as a feedback resistor. When the G color filter is inserted, γG is selected, and when the B color filter is inserted, then the resistor γB, is selected, respectively. On the other hand, the operational amplifier 124b is provided with a variable resistor γE as a feedback resistor. Meanwhile, the resistors γG, γB, γE are adjusted by means of a manipulating member (not shown) and are used for recording the spectral energy ratios ER/EG, ER/EB as well as the exposure amount, as in the case with the first embodiment.

Shown at 123 is the second stage amplifying portion and connected by way of selector switch S4 operated by the selector 114 to the aforesaid operational amplifier 124a or 124b. In other words, when the selector 114 is so selected as to permit either one of the color filters of R, G, B to be inserted in the front portions of the light receiving elements $P_1$, $P_2$, the second operational amplifying portion 123 will be connected by way of the selector switch $S_4$ to the operational amplifier 124a. On the other hand, when the selector 114 is switched so as to interrupt the cooperation of the selector with the R, G, B color filters, the second operational amplifying portion 123 will be connected to the operational amplifier 124b. The second amplifying portion 123 consists of a feedback operational amplifier 123a and is provided with a variable resistor γR and a fixed resistor γ'. The variable resistor γR and fixed resistor γ' are connected in parallel to each other, as shown, and selected by means of selector switch $S_6$ in cooperation with the selector 114. In other words, when the selector 114 is switched so as to permit the insertion of either of the color filters of R, G and B in the front portions of the light receiving elements $P_1$, P2, the resistor γR will be selected as a feedback resistor for the operational amplifier 123a. On the other hand, when the selector 114 is switched so as to interrupt the cooperation with the R, G, B color filters, the resistor γ' will be selected as a feedback resistor for the operational amplifier 123a. Shown at 120 is a voltmeter for indicating the output of the second stage amplifying portion 123, while an arbitrary point and graduations represented by the equation (10) are printed on the indicating dial thereof, as in the case with the first embodiment.

The aforesaid description sets forth the principal construction of the last embodiment, and the other parts of the structure are the same as those of the first embodiment, and thus the description thereof is omitted herein.

In addition, the operations and manipulation of the color balance adjusting device in this embodiment are the same as those of the first embodiment, and thus the description thereof will be given simply herein. In this embodiment as well, the standard negative is first inserted in the exposure light path of an enlarger, and an exposure light source of the enlarger is illuminated, while the respective color compensating filters of Y.M.C. are set to the color densities obtained when a positive print having an optimum color balance is obtained from its standard negative. Then, selector 114 is sequentially switched, and then the values of the variable resistors rR, rG and rB are adjusted sequentially so that the hand of voltmeter 120 points to a predetermined point on the indicating dial, whereby the spectral energy ratio of red, green, and red and blue of the light from an exposure light source is stored as the adjusted resistances of the resistors rG and rB, which light has been transmitted through the Y.M.C. color compensating filters and the standard negative. Furthermore, selector 114 is switched in a manner that the diaphragm of the enlarging lens is set to the diaphragm value obtained when the positive print having an optimum density has been obtained from the standard negative, then the value of the variable resistor rE is adjusted in a manner that the hand of voltmeter 120 points at the exposure time resulting when the positive print having an optimum density from its standard negative is obtained, thereby causing the resistor rE to store the optimum exposure amount.

Subsequently, the standard negative is removed from the exposure light path of the enlarger, and then a given color negative is inserted therein in place of the aforesaid standard negative. Then, the selector 114 is switched sequentially and the color densities of the Y.M.C. color compensating filters are adjusted so as to cause the hand of voltmeter 120 to point at the aforesaid fixed point on the indicating dial thereof. This adjustment permits the respective color compensating filters to be set to color densities which give a positive print having an optimum color balance for a given color negative.

Then, the diaphragm of the enlarging lens is set to the diaphragm value at which the positive print having an optimum density has been obtained from the standard negative, and then the selector 114 is further switched by another stage, so that the exposure time indicated by the hand of voltmeter 120 is read. This exposure time and the aforesaid diaphragm value permits the indication of the exposure amount which will give a positive print having an optimum density for a given color negative. On the other hand, the diaphragm of the enlarging lens is adjusted so as to indicate the exposure time resulting when a positive print having an optimum density is obtained from the aforesaid standard negative. By virtue of the exposure time and diaphragm value of the enlarging lens which has been set at this time, as well, the exposure amount may be indicated which gives a positive print having an optimum density for a given color negative.

While the present invention has been described with respect to the aforesaid two embodiments, it should be noted however, that the present invention is by no means limited to those embodiments. For instance, in the aforesaid two embodiments, the value of the spectral energy of red is selected as the standard, when storing the spectral energy ratio of red, green and blue. However, the value of any spectral energy band may be selected as the standard, as far as the amplification gain of the first stage amplifying portion 23 may be adjusted due to the magnitude of the value of the spectral energy selected as the standard.

On the other hand, since the color balance light receiving element is placed on the enlarging lens board 8 by utilizing the exposure light path of the enlarger 4, the aforesaid two embodiments present color balance adjusting device of a dark room type which is used in combination with an enlarger 4. However, there may be provided a device having a light path equivalent to the exposure light path of the enlarger 4, and then the light receiving elements P₁, P₂ may be provided for the aforesaid device as in the cases with the aforesaid two embodiments, thus presenting a color balance adjusting device of a bright room type, which device may be used in a bright room separated from the room of the enlarger 4. In addition, according to the present invention, a servo-motor adapted to be driven in cooperation with the Y.M.C. color compensating filters may be driven due to the voltage difference between the output voltage at the second stage operational amplifier 23 and the given standard voltage, generated by a constant output generator, whereby the respective color densities of the Y.M.C. color compensating filters may be automatically controlled so as to nullify the voltage difference.

Figure 6:
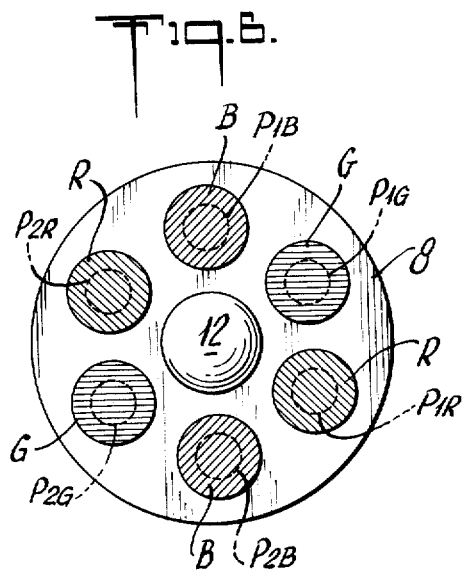
FIG. 6 is a plan view of an modification of the photoelectric converting portion of the embodiment of FIG. 1.

In addition, according to the aforesaid two embodiments, the light measuring filters for R.G.B. are sequentially but alternatively inserted in the front portions of the aforesaid two color balance light measuring elements P₁, P₂. Alternatively, however, as shown in FIGS. 6 and 7, a respective pair of the R light measuring light receiving elements P₁R, P₂R for photoelectrically converting the spectral energy of R. G light measuring light receiving elements P₁G, P₂G, for photoelectrically converting the spectral energy of G, B light measuring light receiving elements P₁B, P₂B for photoelectrically converting the spectral energy of B1 i.e., six elements in total, are placed on the enlarging lens board 8 in a symmetric relation with respect to the optical axis 0 of the exposure light path of enlarger 4, whereby outputs of those pairs of light receiving elements P₁R, P₂R, P₁G, P₂G and P₁B, P₂B are each amplified so as to be introduced to the respective terminals 22R, 22G and 22B of the selector switch S₁. Then, the light measuring filters for R.G.B. may be fixed in front of those light measuring elements.

Furthermore, according to the present invention, the first and second stage operational amplifying portions 23, 24 may simply consist of amplifiers, whose amplification gains are varied due to the adjustments of the variable amplification gain setting means such as variable resistors, variable transformers and variable condensors. For instance, a fixed resistor may be used as a feedback resistor for the aforesaid embodiments, and variable resistors may be used as input resistors for the feedback amplifying circuit. It is well known that the variation in the construction and the outputs thereof due to the temperature change is less, as compared with the logarithmic coverting circuit. Thus, detailed description thereof will be omitted herein.

As is apparent from the foregoing description, the color balance adjusting device according to the present invention, there is not required a logarithmic converting circuit for obtaining the spectral energy ratio of the light which will impart an optimum color balance to the standard negative, and the spectral energies of the light are stored as amplification gains in the amplifying portions. Thus, the device of the present invention dispenses with the conventional temperature compensating circuit, presenting a simple construction and high reliability.

In addition, noise produced at the amplifying portion is amplified linearly, while the output signals of the photoelectric coverting portion, which correspond to the values of the respective spectral energies of R.G.B. are amplified linearly, so that the S/N ratio of the output signal of the amplifying portion is materially improved, as compared with the prior art, except when the output signal of the photoelectric converting portion is extremely small, with the result of a stable indication in the output indicating portion.

I claim:

1. A color balance adjusting device for color printing, comprising:

optical means arranged to receive a color negative and including three density adjustable color compensating filters of yellow, magenta and cyan, and a light source;

photoelectric transducing means for measuring the light from said light source which has traversed a color negative inserted in said optical means, said photoelectric transducing means having three spectral sensitivites to red, green and blue;

selector means transferrable to three positions for selecting the spectral sensitivity of said photoelectric transducing means;

a first amplifying means having three amplification gain setting means alternatively selectable with the selection of respective spectral sensitivities of said photoelectric transducing means, at least two of said amplification gain setting means being adjustable, said first amplifying means having an amplification gain corresponding to the amplification gain setting means thus selected, and said first amplifying means being connected to said photoelectric transducing means; and a first indicating means for indicating the output of said first amplifying means whereby when said selector means are sequentially transferred, those of said amplification gain setting means, which are adjustable, are adjusted in a manner that the respective outputs of said first amplifying means in said first indicating means will be equal to each other for the respective amplification gain setting means, thereby storing the ratio of either two of the spectral energies of red, green and blue of the light from said light source, which light has been transmitted through the three color compensating filters of yellow, magenta and cyan, as well as through the color negative inserted in said optical means.

2. A color balance adjusting device for color printing as set forth in claim 1, wherein said device further comprises a second amplifying means connected between said photoelectric transducing means and said first amplifying means.

3. A color balance adjusting device for color printing, as set forth in claim 1, wherein said second amplifying means has an adjustable amplification gain setting means; the level of the output of said first amplifying means being adjustable by the adjustment of said amplification gain setting means; and said first indicating means indicating if the output of said first amplifying means is at a predetermined level.

4. A color balance adjusting device for color printing, as set forth in claim 3, wherein said photoelectric transducing means includes a common photoelectric converting circuit including at least one light receiving element, and red, green and blue filters which are sequentially shiftable to a front position to intercept the light incident on said light receiving element in response to the corresponding transfer operation of said selector means.

5. A color balance adjusting device for color printing, as set forth in claim 4, wherein neutral density filters having mutually different densities are attachable to said red, green and blue filters, said neutral density filters limiting the intensity of the light from said light source which is incident on said light receiving element, for maintaining the output of said photoelectric converting circuit within the range of predetermined inputs to said second amplifying means.

6. A color balance adjusting device for color printing, as set forth in claim 3, wherein said photoelectric transducing means consists of first, second and third photoelectric converting circuits including at least one light receiving element, respectively, and wherein a red filter is located in front of the light receiving element of said first photoelectric converting circuit, a green filter is located in front of the light receiving element of said second photoelectric converting circuit and a blue filter is located in front of the light receiving element of said third photoelectric converting circuit, respectively.

7. A color balance adjusting device for color printing as set forth in claim 6, wherein neutral density filters having mutually different densities are disposable in front of the light receiving elements of said first, second and third photoelectric converting circuits, said netural density filters limiting the intensity of the light from said light source which is incident on said respective light receiving elements, for maintaining the outputs of said respective photoelectric converting circuits within a predetermined range of input to said second amplifying means.

8. A color balance adjusting device for color printing, as set forth in claim 3, wherein said device further comprises:
   exposure amount detecting photoelectric converting means for photoelectrically transducing the total energies of the light from said light source as transmitted through said yellow, magenta and cyan color compensating filters and the color negative inserted in said optical path;
   a third amplifying means having adjustable amplification gain setting means, said third amplifying means being connected in series with said exposure amount detecting photoelectric converting means;
   a second indicating means for indicating the output of said third amplifying means, said second indicating means having an indicator movable commensurate to the output of said third amplifying means and graduations indicating the exposure time; and
   light quantity controlling means adjustable so as to control the quantity of the light which is emitted from said light source and incident on said exposure amount detecting photoelectric converting means.

9. A color balance adjusting device for color printing, as set forth in Claim 8, wherein said selector means includes another transfer position corresponding to the transfer to said exposure amount detecting photoelectric converting means; said second amplifying means and said third amplifying means having a common amplifier which includes said adjustable amplification gain setting means; one of said amplification gain setting means is selected in response to said selector means for selecting the spectral sensitivity of said photoelectric transducing means; the other of said amplification gain setting means is selected in response to said selected means for selecting said exposure amount detecting photoelectrically converting means; said amplifier has an amplification gain commensurate with the selected amplification gain setting means; the specific one of said amplification gain setting means of said first amplifying means is selected, when said selector means selects either the specific spectral sensitivity of said photoelectrically converting means or said exposure amount detecting photoelectric converting means; and said second indicating means is connected in series with said first amplifying means.

10. A color balance adjusting device for color printing, as set forth in claim 1, wherein said optical means serves as an exposure optical means for an enlarger, said exposure optical means having a projecting means for projecting an object image of an inserted color negative.

11. A color balance adjusting device for color printing as set forth in claim 3, wherein said first indicating means consists of an indicator movable in response to the output of said first amplifying means and a metering means having a fixed index provided in opposing relation to said indicator.

12. A color balance adjusting means for color printing as set forth in claim 3, wherein said first indicating means consists of an indicating member adapted to indicate if the output of said first amplifying means is at a predetermined level.

13. A color balance adjusting device for color printing as set forth in claim 1, wherein said device further comprises:
   means for generating a predetermined constant output, said constant output generating means is connected in parallel with said first amplifying means; and
   a servo-motor operable until the difference in output between said amplifying means and said predetermined constant output generating means is eliminated, said servo-motor being capable of adjusting the color densities of respective filters in association with said color compensating filters.

14. A color balance adjusting device for color printing, comprising:
   optical means including three color compensating filters of yellow, magenta and cyan, the color densities of which are adjustable, and a light source, said optical means being so arranged that a color negative can be inserted therein;
   photoelectric transducing means for measuring the light from said light source which has traversed a color negative inserted in said optical means, said photoelectric transducing means having three spectral sensitivites of red, green and blue;
   selector means transferrable to three positions for selecting the spectral sensitivity of said photoelectric transducing means;
   a first amplifying means consisting of a first, second and third amplifier circuits connectd in parallel with each other, said first, second and third amplifier circuits being connected in series to said photoelectric transducing means and at least two of said amplifier circuits having adjustable amplification gain setting means;
   a first indicating means for indicating the output of said first amplifier circuit, said first indicating means being adapted to be connected to one of said first, second and third amplifier circuit members in association with the transfer operation of said selector means which selects the spectral sensitivity of said photoelectric transducing means;
whereby when said selector means are sequentially transferred, said adjustable amplification gain setting means is adjusted in a manner that the respective outputs of said first amplifying means, which outputs are indicated on said first indicating means, will be equal to each other, thereby storing the ratio of either two of said spectral energies of red, green and blue of the light which has been transmitted through said three kinds of color filters of yellow, magenta and cyan, as well as through the color negative inserted in said optical means.

15. A color balance adjusting device for color printing, as set forth in claim 14, wherein said device further comprises:
a second amplifying means connected in series to one of said first, second and third amplifier circuits by way of said selector means and also connected in series to said first indicating means.

16. A color balance adjusting means for color printing as set forth in claim 15, wherein said second amplifying means has adjustable amplification gain setting means, whereby the output of said second amplifying means which is indicated on said first indicating means, may be adjusted by the adjustment of said amplification gain setting means, said first indicating means indicating if the output of said second amplifying means is at a predetermined level.

17. A color balance adjusting device for color printing, as set forth in claim 16, wherein said device further comprises:
exposure amount detecting photoelectric transducing means for photoelectrically converting the total energies of the light from said light source, which light has been transmitted through the color compensating filters of yellow, magenta and cyan as well as through the color negative inserted in said optical means;
a light quantity controlling means adjustable so as to control the quantity of the light from said light source, which light is incident on said exposure amount detecting photoelectric transducing means;
a third amplifying means;
a second indicating means connected in series with said third amplifying means to said exposure amount detecting means, said second indicating means having an indicator movable in response to the output of said third amplifying means, and graduations for indicating the exposure time, which graduations are provided in opposing relation to said indicator.

18. A color balance adjusting device for color printing, as set forth in claim 17, wherein said selector means includes another transfer position corresponding to said third amplifying means; said second amplifying means has two amplification gain setting means, at least one of which is adjustable; one of said amplification setting means is selected when said switching means selects said first, second and third amplifying members of said first amplifying means; the other of said amplification gain setting means is selected when said switching means selects said exposure amount detecting photoelectric transducing means; the amplification gain of said second amplifying means depends merely on the amplification gain setting means selected; and said second indicating means is connected in series to said second amplifying means.

19. A color balance adjusting device for color printing as set forth in claim 14, wherein said optical means serves as an exposure optical means for an enlarger, said exposure optical means having a projecting means for projecting an object image of the color negative inserted.

20. A color balance adjusting device for color printing, as set forth in claim 14, wherein said photoelectric transducing means has a photoelectric converting circuit including at least one light receiving element in common, and color filters of red, green and blue which are sequentially movable to a position to cover the front of said light receiving element in response to the selected transfer position of said selector means, said photoelectric converting circuit being connected in series to said first, second and third amplifying members, respectively.

21. A color balance indicating device comprising means selectively responsive to light in three different spectral ranges for producing electric output signals which are respectively proportional to the three different spectral ranges of said light, an amplifier network having three gain circuits, at least two of said gain circuits being adjustable to independently adjust the gain of said amplifier network so that the outputs of said amplifier network, which are respectively proportional to the output signals of said producing means, have a desired ratio, indicating means responsive to the outputs of said amplifier network, means for applying said respective output signals to said amplifier network, and means for alternatively selecting one of said gain circuits for said amplifier network in accordance with the output signals which are applied to said amplifier network.

22. A color balance adjusting device for color printing, comprising:
optical means including three density adjustable color compensating filters of yellow, magenta and cyan and a light source, said optical means being so arranged that a color negative can be inserted therein;
photoelectric transducing means for measuring the light from said light source which has a traversed color negative inserted in said optical means, said photoelectric transducing means having separate spectral sensitivities to red, green and blue;
selector means transferrable to three positions for selecting the spectral sensitivity of said photoelectrically converting means;
a first amplifying means having three amplification gain setting means which are alternatively selected in association with the operation of said selector means for selecting the spectral sensitivity of said photoelectric transducing means, at least two of said amplification gain setting means being adjustable, said first amplifying means having an amplification gain corresponding to the amplification gain setting means thus selected, and said first amplifying means being connected to said photoelectric transducing means; and
a first indicating means for indicating the output of said first amplifying means, said first indicating means being connected to said first amplifying means;
whereby when said selector means are sequentially switched, those of said amplification gain setting means, which are adjustable, are adjusted in a manner that the respective outputs of said first amplifying means in said first indicating means will have a predetermined ratio, thereby storing the ratio of either two of the spectral energies of red, green and blue of the light from said light source, which light has been transmitted through the three kinds of color compensating filters of yellow, magenta and cyan as well as through the color negative inserted in said optical means.

* * * * *